United States Patent
Gauthier et al.

(12)

(10) Patent No.: US 6,296,812 B1
(45) Date of Patent: Oct. 2, 2001

(54) STRIPPING AND SEPARATING APPARATUS AND ITS USE IN FLUIDISED BED CATALYTIC CRACKING

(75) Inventors: Thierry Gauthier, Saint Genis Laval; Patrick Leroy; Jérôme Bayle, both of Lyons; Taisei Miura, Paris, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/243,116

(22) Filed: Feb. 3, 1999

Related U.S. Application Data

(63) Continuation-in-part of application No. PCT/FR98/01866, filed on Aug. 31, 1998.

(30) Foreign Application Priority Data

Sep. 1, 1997 (FR) .................................................. 97 10929
Jul. 28, 1998 (FR) .................................................. 98 09672

(51) Int. Cl.[7] .................................. B01J 8/08; B01J 8/18
(52) U.S. Cl. .............................................. 422/144; 422/139
(58) Field of Search ..................................... 422/139, 144, 422/255, 140–143, 145; 55/474, 345; 96/150, 123; 95/275

(56) References Cited

U.S. PATENT DOCUMENTS 2,402,845 * 6/1946 Rodman ................................ 55/345
4,313,910 * 2/1982 Dries et al. .......................... 422/147
4,664,888 * 5/1987 Castagnos, Jr. ..................... 422/147

FOREIGN PATENT DOCUMENTS 0 139 390 A1 * 5/1985 (EP) .

* cited by examiner

*Primary Examiner*—Marian C. Knode
*Assistant Examiner*—Alexa A Doroshenk
(74) *Attorney, Agent, or Firm*—Millen, White, Zelano & Branigan, P.C.

(57) ABSTRACT

An apparatus for separating and stripping a mixture of gas and particles comprises an envelope having separation chambers and circulation chambers distributed about a reactor, the upper portion of each separation chamber comprising an inlet opening communicating with the reactor and with a zone for rotating the mixture in a vertical plane. Each separation chamber comprises two lateral walls which are also walls for the circulation chamber, at least one of the walls of each chamber comprising a lateral outlet opening for mixing gas and particles into the adjacent circulation chamber. Each separation chamber also comprises an axial opening for particles to enter a stripping chamber, the envelope further comprises a conduit for evacuating a gas-particle mixture connected to at least one secondary separator and the stripping chamber communicating with the conduit via circulation chambers. Application of this apparatus is to fluidized bed catalytic cracking of hydrocarbons in a riser and/or dropper.

21 Claims, 5 Drawing Sheets

US 6,296,812 B1

STRIPPING AND SEPARATING APPARATUS AND ITS USE IN FLUIDISED BED CATALYTIC CRACKING

CROSS-REFERENCE TO RELATED APPLICATION

This application is a continuation-in-part of PCT/FR98/01866, filed Aug. 31, 1998, claiming priority of French Application 97/10929, filed Sep. 1, 1997, and French Application 98/09672, filed Jul. 28, 1998.

FIELD OF THE INVENTION

The invention relates to a separating and stripping apparatus and its use in a process for catalytic cracking of hydrocarbons in an upflow and/or downflow reactor.

BACKGROUND OF THE INVENTION

Catalytic cracking units are generally constituted by a reaction zone in which the catalyst is brought into contact with a hydrocarbon feed in a reactor which is generally in the form of an elongated tube, then at least partially separated from the hydrocarbons in one or more separation stages, the hydrocarbons, accompanied by as small a quantity as possible of catalyst, leaving the reaction zone to rejoin the hydrocarbon fractionation section. The catalyst from the different separation stages is brought into contact with a gas which is different from the hydrocarbons, such as nitrogen or steam, to encourage desorption of the hydrocarbons entrained in the pores of the catalyst, this phase generally being known as stripping. The catalyst is then evacuated to a regeneration zone where the coke formed during the reaction in the tube reaction and hydrocarbons which have not yet been desorbed during the stripping stage are burned in an oxidising medium.

In order to obtain good selectivities for upgradable products in the reaction zone of the catalytic cracking unit, it is necessary:

to rapidly evacuate the gaseous products produced in the contact zone between the hydrocarbons and catalyst after the first separation stage to avoid thermal degradation of the intermediate products of the cracking reactions which generally have the highest added values;

to limit the entrainment of hydrocarbons with the catalyst, and thus to produce effective catalyst stripping.

A number of ways exist for carrying out these operations of separation of desorption and the literature is fall of devices developed for catalytic cracking and which are more or less effective for such different operations. And while it is relatively simple to carry out rapid separation or effective stripping, it is difficult to carry out rapid separation and effective stripping simultaneously.

Thus rapid separation can be effected using cyclones directly connected to an upflow reactor, usually termed a riser in the art, as described in U.S. Pat. No. 5,055,177. In such systems, cyclones connected to the riser are inside a large vessel which generally also encloses a second cyclone stage. The gas separated in the first stage enters the second cyclone stage for more severe separation. The catalyst is directed into the dense phase of a fluidised stripping bed where steam is injected as a counter-current to the catalyst to desorb the hydrocarbons. Such hydrocarbons are then evacuated from the reactor in the diluted phase and introduced into the separation system into the second cyclone stage. The fact that there are two cyclone stages, one connected to the riser carrying out primary separation, the second generally being connected to the outlet for gas from the first stage cyclones, necessitates a very large diameter for the vessel surrounding the two cyclone stages. That vessel is only travelled by the gases desorbed in the stripper, or by the gases entrained by the catalyst in the solid outlets (diplegs) of the first stage. The gases from the stripping section are thus systematically exposed to a long term thermal degradation in the stripper since if the primary cyclone functions correctly, a fairly small quantity of hydrocarbons is entrained in the dipleg of the primary cyclone towards the stripper. The volume of the large vessel being large, and the quantity of hydrocarbons and stripping steam being fairly small, the surface velocity of the gases in the diluted phase of the reactor outside the primary cyclones will not be above a few centimeters per second and the evacuation time for hydrocarbons stripped or entrained in the diplegs with the catalyst will necessarily be of the order of one to a few minutes.

A further disadvantage of that separation system is that it introduces hydrocarbons entrained or adsorbed onto the catalyst in localised fashion into the fluidised stripping bed. Since the fluidised bed is a poor radial mixer but a very good axial mixer, there is an inevitable loss of efficiency in the stripping zone. It would be possible to improve stripping by introducing stripping gases directly into the solid outlet. Nevertheless, this would only be effective if the catalyst flowed slowly in the cyclone outlet in order not to entrain gases, which is not possible to achieve if proper operation of the primary cyclones is to be retained.

It is also possible to bring the hydrocarbons and catalyst into contact in a dropper reactor as described in French patent FR-A-2,753,453. That type of very rapid, homogeneous piston contact is generally characterized by shorter contact times than in riser type apparatus, enabling higher temperatures and higher catalyst circulation rates to be used, and thus encouraging the formation of added value products such as LPG, and in particular olefins and gasoline. More so than with a riser reactor, such conditions necessitate effective separation of the hydrocarbons from a large portion of the catalyst in a short period and with proper integration with the catalyst stripping phase.

Rapid separation can also be carried out in a single induced vortex chamber such as that described in U.S. Pat. No. 5,584,985. That technology, termed a vortex separation system, has the advantage of simultaneously combining separation and stripping.

Solids stick to the wall under a centrifugal effect and flow towards the base of the vessel where they are brought into contact with a stripping gas which is evacuated with the desorbed hydrocarbons towards the top of the separation chamber. Unfortunately, to obtain good separation efficiency with such a system, the chamber size must be limited in order for the centrifugal force exerted on the particles to be sufficiently high. That is incompatible with a low stripping gas rise rate to limit the re-entrainment of particles descending after they have been separated. Combining separation and stripping in the same chamber thus does not enable the two operations to be carried out properly. Either separation is favoured to the detriment of stripping, or stripping is favoured to the detriment of separation, which is not compatible with proper hydrocarbon desorption. Further, and this constitutes a major problem with such technology, the separated catalyst preferentially flows on the wall and thus is not easily brought into contact with the stripping gas which is distributed over the whole cross section of flow of the chamber.

The two examples given above clearly show that it is difficult to carry out separation and stripping in a single chamber, and that rapid separation using known high performance separators such as cyclones necessarily involves deterioration of the performances of the stripper.

One aim of the present invention is to overcome the disadvantages of the prior art. We have thus sought to develop a technique which enables sufficient separation efficiency to be obtained, i.e., over 75%, combined with a desorption apparatus, the assembly being highly compact to enable all of the gas moving from a riser or dropper to the fractionation column associated with the reaction zone to be resident for less than 3 seconds in the separation and stripping zone, to ensure good contact between the catalyst from the separation chambers and the stripping gas, and to evacuate the desorbed hydrocarbons rapidly because of optimal compactness of the equipment.

SUMMARY OF THE INVENTION

More precisely, the invention provides an apparatus for separating and stripping a gaseous mixture and a stream of particles, comprising a reaction envelope (51) containing a vessel (50) for separating the particles from the mixture and a vessel for stripping the separated particles located below the separation vessel (50), said vessel comprising a plurality of separation chambers (2) and a plurality of circulation chambers (3) distributed axially about one extremity of a central reactor of elongate form (1), and disposed in alternating manner about the reactor in which the gaseous mixture and particle stream circulates, the upper portion of each separation chamber (2) comprising an inlet opening (20) communicating with the reactor and with a rollover zone defined in part by one outer wall of the separation chamber in the case of a riser reactor or in part by a deflector (21) at the base of the reactor in the case of a dropper reactor, so as to separate the particles from the gaseous mixture in a substantially vertical plane, each separation chamber (2) comprising two substantially vertical lateral walls (24) which are also the walls of the circulation chamber (3), at least one of the vertical walls (24) of each chamber (2) comprising a first lateral outlet opening (5) below the inlet opening in the case of a riser or above opening (20) in the case of a dropper, enabling the gaseous mixture to communicate with the adjacent circulation chamber, each separation chamber comprising an outer wall (21, 121) and an inner wall which with the lateral walls define an opening (6, 6a) for a substantially axial outlet for particles located below the first gaseous mixture outlet opening (5), particle outlet opening (6, 6a) communicating below the separation chambers with the stripping chamber (9, 30) which contains at least one principal stripping means (11), envelope (51) further comprising at least one conduit (14) for evacuating a mixture containing gaseous effluents and a minor portion of particles from the circulation chamber, and at least one secondary separator (16) for separating particles of gaseous effluents connected to the evacuation conduit (14) comprising an outlet (19) for gaseous effluents and a particle outlet (17), said stripping chamber communicating with said mixture evacuation conduit (14) via at least the circulation chambers (3).

In more detail in the case of a riser, the upper portion of each separation chamber comprises an inlet opening communicating with the reactor and with a rollover zone to separate the particles from the gaseous mixture by a centrifugal effect, the rollover zone being adapted to rotate the gaseous mixture and particles in a vertical plane through an angle of at most 360 degrees, each separation chamber comprising two substantially vertical lateral walls which are also the walls of the circulation chambers, at least one of the vertical walls of each chamber comprising a first lateral outlet opening below the inlet opening enabling the gaseous mixture to communicate with the adjacent circulation chamber.

Each separation chamber comprises an outer wall defining the rollover zone and an inner wall opposite the outer wall which with the lateral walls define a second opening for substantially axial exit of particles, located below the first gaseous mixture outlet opening, the second particle outlet opening communicating with the stripping chamber below the separation chambers.

In a variation, in the case of a dropper reactor, the reactor comprises a deflector (21) for gas and particles at its lower extremity which laterally deflects the flow from the reactor towards the separation chambers and initiates rotation of the flow in a substantially vertical plane to separate gas particles by a centrifugal effect.

The upper portion of each separation chamber comprises an inlet opening (20) communicating with the reactor and defined by said deflector (21) and the reactor, an outer wall (121) the upper portion of which co-operates with the deflector (21) to form a gas and particle rollover zone, and a first outlet opening (122) located substantially in the extension of the deflector and enabling particles separated from the gas to pass to the lower portion of the separation chamber.

Each separation chamber (2) also comprises two substantially vertical lateral walls (24) which are also walls of the circulation chambers (3), at least one of the walls (24) of each chamber (2) comprising a second lateral outlet opening (5) located above the deflector (21) and above the first opening (122) to enable gas cleaned of a large portion of the particles to communicate with the adjacent circulation chamber.

In one feature of the invention, the common walls of the separation chambers and circulation chambers each comprise an opening of substantially the same cross section.

Advantageously, each separation chamber comprises, in the case of a riser reactor below and in the case of a dropper reactor above the inlet opening for the gas-particle mixture leaving the reactor, means to prevent re-circulation of the gaseous mixture, for example a deflector, connected to the reactor and to the vertical walls of the separation chamber. This reduces the pressure drop between the reactor and the gas outlet. This deflector preferably rolls through an angle of at least 30 degrees, and in a vertical plane it may follow at least a portion of the shape of the lateral opening of said walls.

Each lateral wall usually comprises a lateral opening enabling the gas separated from the majority of particles to escape via the circulation chambers and the conduit for evacuation to the secondary gas-particle separator.

In a further feature of the riser apparatus, the particle rollover zone in the upper portion of the separation chamber and the deflector preventing re-circulation of the flow are substantially co-axial.

The inner wall of the separation chamber can be at least a portion of the outer wall of the reactor.

In a feature of the dropper apparatus, the deflector for laterally deflecting the flow and the deflector above that first deflector preventing re-circulation of the flow are substantially co-axial.

The outlet opening for particles from the separation chambers can be substantially perpendicular to the reactor axis.

In order to prevent effects due to thermal stresses which are different because of the different temperatures between the reactor and the outer wall of the apparatus, it is advantageous in a first variation for the separation vessel comprising the assembly of separation chambers to be surrounded by an envelope which is distinct from the outer wall of the separation chambers. Preferably, the annular space between this envelope and the outer wall of the separation chambers is a minimum to limit the residence time of the stripping gas in the apparatus. The outer envelope is then the outer wall of the circulation chambers.

In a further variation, the envelope constitutes the outer wall of the separation and circulation chambers. In this case, expansion means are provided, for example in the conduit for evacuating the mixture to the secondary cyclones.

Complementary stripping means can be disposed below the particle outlet openings from the separation chambers. The stripping effluents obtained are then immediately evacuated towards the top of the circulation chambers and treated in secondary separators.

Once separated, the particles drop into a stripping chamber. It can be attached to the lower portion of the envelope or in a variation, it can be contained in the lower portion of a thermally insulated main chamber which is sufficiently large to accommodate the secondary separators, separation vessel and its envelope, the stripping chamber and the upper extremity of the reactor. In this case, it may be advantageous for the chamber to communicate with the secondary separator via at least one orifice located upstream of the secondary separators, for example on the conduit for evacuating the gaseous mixture and particles upstream of the separators.

In a further variation, the stripping chamber is connected to the lower portion of the envelope, forming an assembly in which the secondary cyclone separators may be outside the envelope.

In a yet still further variation, the secondary separators are inside the envelope.

At least one principal stripping means using a gas is normally located in the stripping chamber.

Advantageously, means for rendering the flow of particles from the separation chamber uniform are located in the upper portion of the stripping chamber placing them, for example, beneath the complementary stripping means.

The lower portions of the circulation chambers are open to allow gases from the catalyst in the fluidised bed to rise. This opening from the circulation chambers above the fluidised bed is advantageously located at the bottom of a portion with a conical cross section which has the effect of limiting the possibilities of gases emanating from the lateral outlet opening circulating beneath this opening in the diluted phase located above the lower opening. In order to limit the entrainment of the catalyst from the fluidised bed entering via the lower opening towards the apex of the circulation chambers and subsequently towards the secondary cyclones, it is advantageous to locate these openings about 1 to 10 m, preferably 2 to 5 m, above the fluidised bed surface. Further, to simplify the construction of the equipment, the conical section of the circulation chambers preferably has the same inclination as the conical section of the separation chambers.

The separated solids leaving via the opening in the separation chamber or via the opening in the circulation chamber are then introduced into the principal stripping zone of the unit, constituted by a fluidised bed the top of which is preferably between the opening in the circulation chambers and that of the separation chambers, generally 1 to 2 m above the separation chamber opening and at least 2 m beneath the circulation chamber opening. In general, this stripping zone is a fluidised bed contact zone where descending solids come into contact with a counter-current of a stripping gas such as steam, nitrogen or ammonia. The average mass flow rate of the catalyst in this zone is generally about 10 to 300 kg/s/m$^2$, preferably 30 to 150 kg/s.m$^2$. The average rate at which the stripping gas rises is generally in the range 0.1 to 1 m/s.

The rate at which the gas rises through the circulation chamber opening towards the external cyclone is normally in the range 0.2 to 10 m/s, preferably in the range 0.5 to 5 m/s. This confines the separated gas emanating from the separation chamber via the lateral orifice in the volume of the circulation chamber.

The invention also relates to the above apparatus in a catalytic cracking process for hydrocarbons.

BRIEF DESCRIPTION OF DRAWINGS

The invention will be better understood from the accompanying figures which schematically illustrate the apparatus and in which.

In the figures, the same reference numerals indicate the same means.

Figures 1, 3:
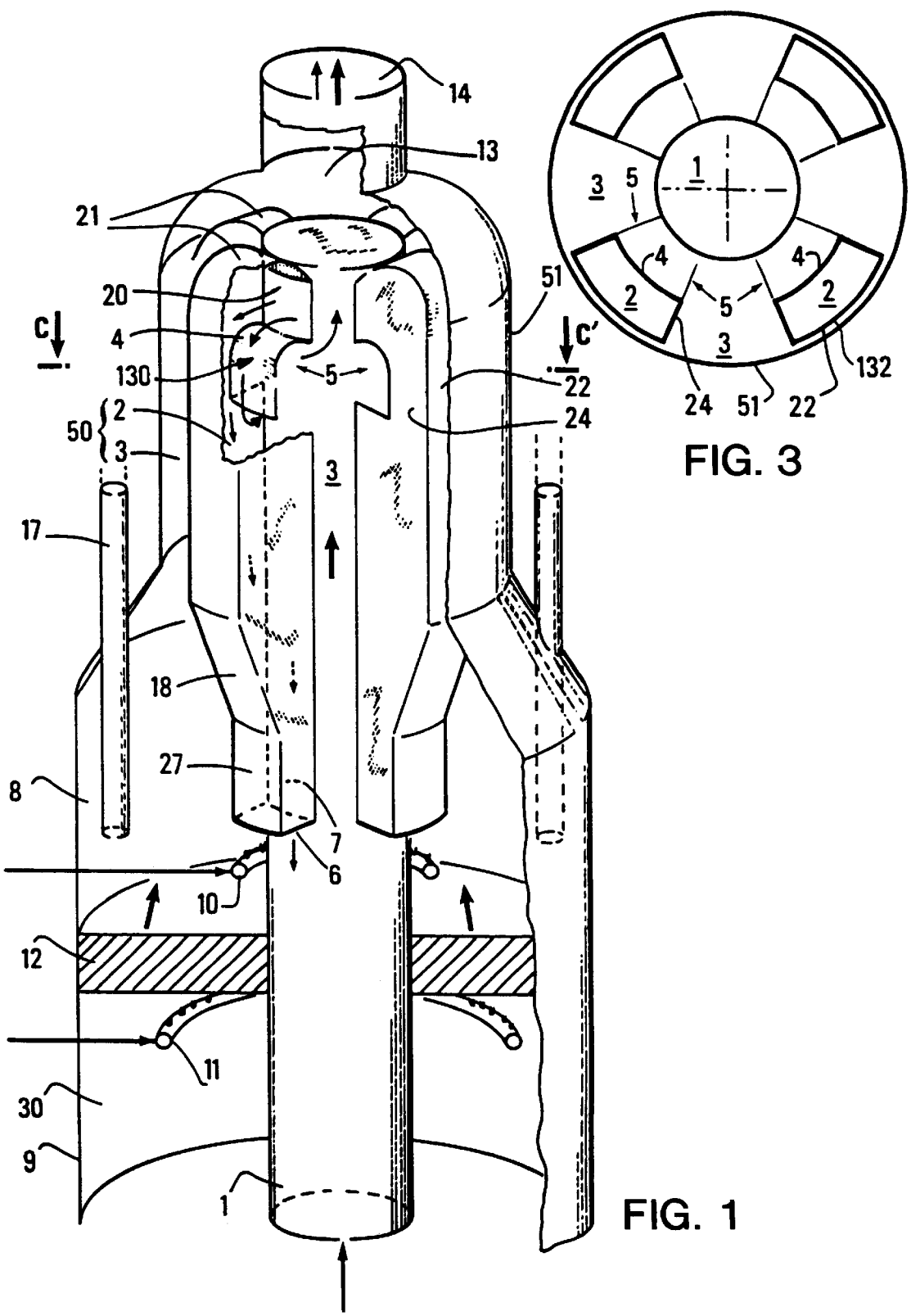
FIG. 1 shows a perspective view of the separation and stripping vessel at the outlet of a riser reactor.
FIG. 3 shows a cross section of an arrangement of alternate separation chambers and circulation chambers for the ensemble of cracking and stripping effluents at CC' in FIG. 1.

The invention concerns a system for separating and stripping a finely divided porous solid phase, which may be impregnated with a liquid, from a gas phase at the outlet from a reactor for bringing an essentially gaseous fluid phase into contact with a solid phase, the outlet being tubular and substantially vertical. It is particularly intended for separating effluents at the outlet from catalytic cracking reactors where the gaseous and liquid phases comprise mixtures of hydrocarbons and water, and where the solid is a catalyst, for example a silica-alumina based catalyst generally containing at least 15% of zeolites. From a gassolid mixture, where the solid possibly contains liquid fractions in its pores, the apparatus of the invention can produce a gas-solid phase containing less than 25% of solids and the essential portion of the gaseous phase introduced to the inlet, and at least 75% of the solids introduced to the inlet, these latter then undergoing at least one contact phase with a carefully selected gas (such as steam) to at least partially desorb the liquid vapour mixture contained inside the pores of the solid.

These performances are obtained by means of a compartmented arrangement of alternate separation chambers (2)

and circulation chambers (3) axially distributed about a reactor, for example a riser, and communicating between them, as shown in FIGS. 1 to 4. The equipment is constituted by N separation chambers and N effluent circulation chambers, N being in the range 2 to 10, preferably in the range 2 to 6. An envelope (51) surrounds a separation chamber (50) which comprises the assembly of these separation chambers (2) and circulation chambers (3).

Each separation chamber (2) is connected to reactor (1) by means of an opening (20) formed in the upper portion of the reactor wall. The openings (20) of each compartment (2) all have the same cross section of flow. The upper portion of the separation chamber is intended to cause separation of the gas and solid phases by a centrifugal and inertial effect which is exerted on the solid due to a change in the direction of flow during passage in the upper portion of the separation chamber. The invention thus concerns any means employed to cause a change of flow direction in a plane containing the reactor axis, which may or may not be accompanied by a change in the cross section of flow to shape the flow at the reactor outlet. One example is shown by the flow direction change means 130 in FIG. 1. Opening (20) opens into a compartment distributed axially about the reactor axis, the upper portion of which is constituted by a wall (21), substantially horizontal at its junction with the reactor, which then curves downwards to become substantially vertical (22). It is also possible to substitute the curved portion by a clean angular transition, to incline the wall (21) connected to the reactor upwardly at an angle of 10° to 90° with the vertical to obtain, for example, an inlet which is tangential to the riser axis, and to incline wall (22) by about 70° with respect to the vertical. This wall (22) is distinct from envelope (51) and delimits with an outer wall 132 a minimum annular space.

Each separation chamber is provided with two substantially vertical lateral walls (24) preferably located in a plane containing the reactor axis (1), which delimit the separation chambers (2) from the circulation chambers (3). An opening (5) is located in each wall (24) to evacuate the gas phase and less than 25% of the solid which has entered each separation chamber via opening (20). This opening is preferably semicircular in shape, but other shapes (rectangular, trapezoidal) are also possible. The highest point of opening (5) is generally located beneath the lowest point of opening (20). The lowest point of opening (5) is located above an opening (6) which evacuates the essential portion of the solids and is located at the bottom of separation chamber (2).

In order to prevent re-circulation of the gaseous mixture in the separation chambers and thus to obtain good separation efficiency, it is preferable to isolate outlets (5) from inlet zone (20). Advantageously, a deflector (4) as described in French patent application FR 97/00327 can be used, preferably being axially symmetrical about the reactor axis and preferably following the shape of opening (5) in the vertical plane. The width of the opening can be identical with the width of the separation chamber. This deflector will advantageously allow a the solid gaseous mixture leaving at (5) a cross section of flow of at least 10% of the cross section of flow offered by opening (5), preferably 50%. It may turn through an angle of at least 30 degrees, substantially coaxially with the rollover zone.

Figure 2:
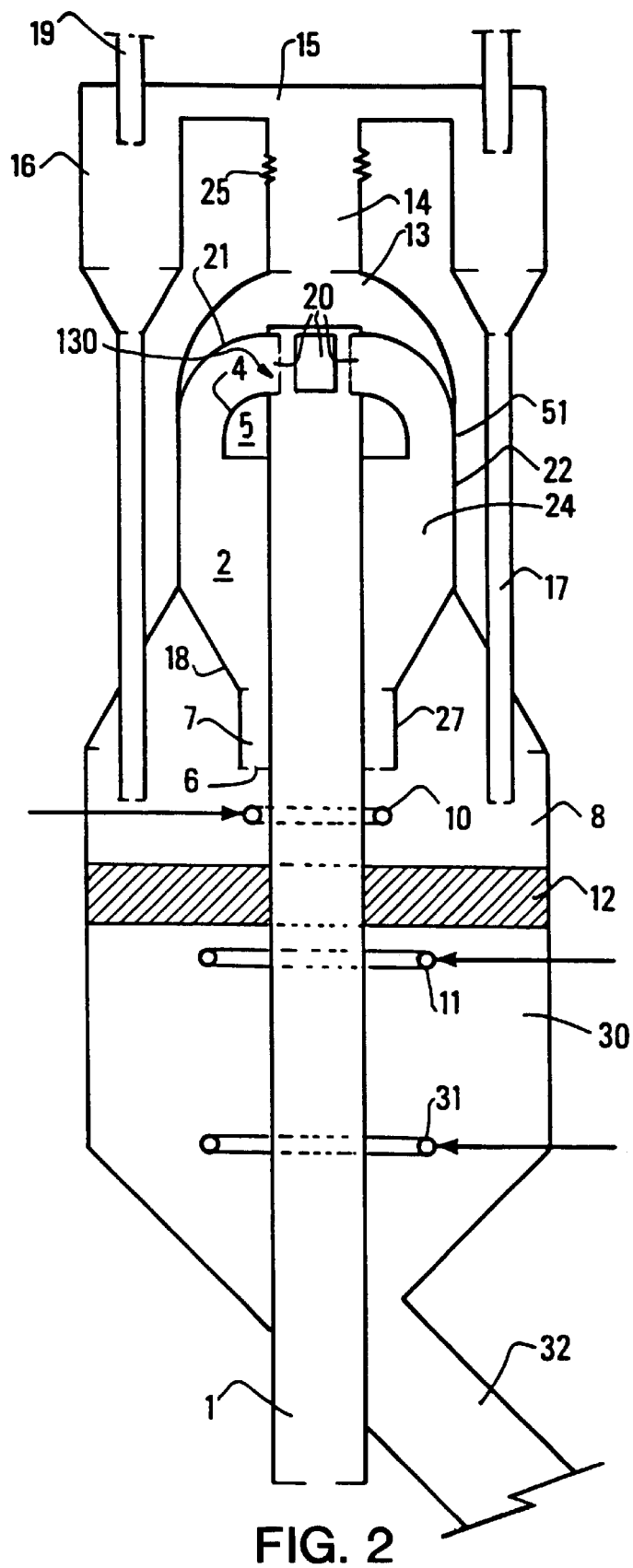
FIG. 2 shows a longitudinal section through the chambers for separating particles from gaseous cracking effluents and the presence of external secondary separators for separating particles and the ensemble of the cracking and stripping effluents.

The essential portion of the solid phase, which may entrain a small quantity of gas between its grains and gas and liquid adsorbed in its pores, flows substantially along wall (22) and leaves each separation chamber via an opening (6) located lower than opening (5) in a plane substantially perpendicular to the reactor axis, and perpendicular to opening (5). In order to restrict the quantity of gas entrained with the solids in opening (6), it is prudent to limit the cross section of flow of this opening. This can be achieved by direct inclination of the wall (22) at a re-entry angle towards the riser at an angle in the range 5° to 45° to the vertical, preferably in the range 10° to 30°, or by extending wall (22) if it is substantially vertical by a wall inclined at a re-entry angle towards the riser at an angle of 5° to 45° to the vertical, preferably in the range 10° to 30°, as shown in FIG. 2, to create a conical transition zone (18) and a zone (7) delimited by the riser and a substantially vertical wall (27) with a limited cross section of flow with respect to the cross sections of flow in the upper portion of the separation chamber. It is also possible to extend wall (22) vertically to the bottom of chamber (2) and to insert a solid block of material, for example a refractory material, around the reactor in the outlet zone to create a restricted flow in zone (7) with respect to zone (2) while maintaining walls (22) and (27) in perfect alignment.

The circulation chambers (3) have an outer wall which is a portion of the envelope and the two substantially vertical lateral walls (24) preferably located in a plane containing the axis of reactor (1), which delimit the separation chambers from the circulation chambers. An opening (5) is located in each wall (24), placing the separation chambers in communication with the circulation chambers. To limit problems with bulk, the upper portion of the circulation chambers (3) preferably have substantially the same radius with respect to the reactor axis as the separation chambers (2). Nevertheless, this condition is not indispensable to proper operation of the apparatus. The diameter of the lower portion of the circulation zone (8) can be larger than that of portion (3). In this case, it will contain all of the lower portions of the separation chambers (2) and its outer wall (9) will extend 360° about the reactor axis (1).

The circulation chambers communicate with each other above the apex of separation chambers (2) and their geometry in this zone reduces to form a head (13) which forms the outlet for the essential portion of the gas phase and less than 25% of the solids from the apparatus.

The lower portions of circulation chambers (3) also communicate with each other, at different positions depending on the geometry of the apparatus:

if the circulation chamber diameter increases (as shown in FIG. 1), they communicate with each other at zones (8);

if the circulation chamber diameter remains constant, they communicate with each other at zone (8) if a cross section of flow restriction zone is applied in separator outlet (7), or beneath opening (6) if outlet (7) from the separation zones does not have a cross section of flow restriction.

In order to properly distribute the catalyst from separation zone outlets (7) over the whole cross section of flow of the combined circulation chambers, means (12) can be distributed over the whole cross section of flow to render the flow uniform and limit re-circulation zones. These means will, for example, be stacks of packing, such as those used in distillation columns, ranks of interlaced tubes positioned one over the other, or inclined plates forming a particular crisscross pattern to encourage radial migration of the solid. Means (10) for introducing a gas such as nitrogen or steam or ammonia to encourage desorption of the liquid or gaseous hydrocarbons contained inside the pores of the catalyst grains and evacuate them immediately via the circulation chambers are located beneath this packing and beneath the outlet (6) from the separation zone.

The stripped solids are then introduced into the principal stripping zone (30) of the unit which is generally a fluidised bed contact zone where the solid, which is falling, comes into contact at least once with a counter-current of a stripping gas such as steam, nitrogen or ammonia introduced via rings (11).

Specific insertion of the apparatus of the invention into the reaction zone of a catalytic cracking unit and its operation will now be described for two particularly suitable cases shown in FIGS. 2 and 4 which use different techniques for dimensioning the units.

In FIG. 2, which is a variation of FIG. 1, envelope (51) constitutes the outer wall of separation chambers (2) and, of course, the outer wall of the circulation chambers. To prevent thermal stresses, expansion means (25) are located on the effluent evacuation conduit (14). The gas-solid effluents (the solid containing a fraction of gas and of liquid in its pores) enter the apparatus of the invention only partially represented in the figure via opening (20) shown in FIG. 1. The solids and the gas are essentially separated in the upper portion of separation chambers (2) and the gas, accompanied by less than 25% of the solid, enters circulation chambers (3) via openings (5). This stream is then evacuated towards the upper portion of the circulation chambers (13) and towards conduit (14) which combines all of the cracking and stripping effluents. Conduits (15) which open laterally from the walls of conduit (14) carry the effluents to the inlet to external gas-solid secondary separators such as cyclones (16), the number of which is generally close to the number of separation chambers, to complete the separation of the solids entrained with the gas downstream of the separation and stripping chambers. The gases, generally containing less than 0.02% by weight of solid particles, are evacuated from the cyclones via outlet (19) and are generally sent directly by conventional means to a column for fractionating different hydrocarbon cuts in the case of a catalytic cracking process. The example described above shows that N circulation chambers are connected to M cyclones (16) via a single conduit (14) connected to the cyclones by M conduits (15). When M and N are equal, it may be advantageous to connect each circulation chamber directly to a separator via a specific conduit. The solids which are not entrained by the gas in separation chamber (2) leave it via opening (6) and can possibly undergo a first contact with a stripping gas introduced beneath the outlet opening (6) via means (10), being distributed over the whole cross section of flow offered by the stripping chamber by means (12) which render the flow uniform, and then undergo a second contact with a stripping gas introduced beneath means (12) via means (11) as shown in FIGS. 1 and 2. The solids are mixed with solids recycled from cyclones (16) via diplegs (17) preferably located above radial homogenisation means (12) if these are used in the dimensioning of the apparatus. The solids can then flow downwards into a zone (30) containing other means for introducing a stripping gas which are well known in the prior art, and can then be evacuated to the regeneration zone of the catalytic cracking process via an outlet (32) the disposition of which can, for example be laterally of zone (30) with an inclination of at least 30° downwards from the horizontal. The stripping gases introduced via the different means used in zone (30) and by means (10) which can optionally be used, also the gas and liquids desorbed from the catalyst pores, are evacuated to cyclones (16) through the circulation chambers (3) where they rejoin the gases separated directly in the separation chamber and evacuated through openings (5).

In FIG. 3, a transverse section through CC' in FIG. 2 shows the presence of four separation chambers (2) and four circulation chambers (3) for effluent, in which the inner and outer walls are partially coaxial with reactor (1) and the envelope (51) of the apparatus. The common lateral walls (24) of these chambers are radial and include openings (5) which enable the cracking effluents to communicate with the circulation chambers (3).

Figure 4:
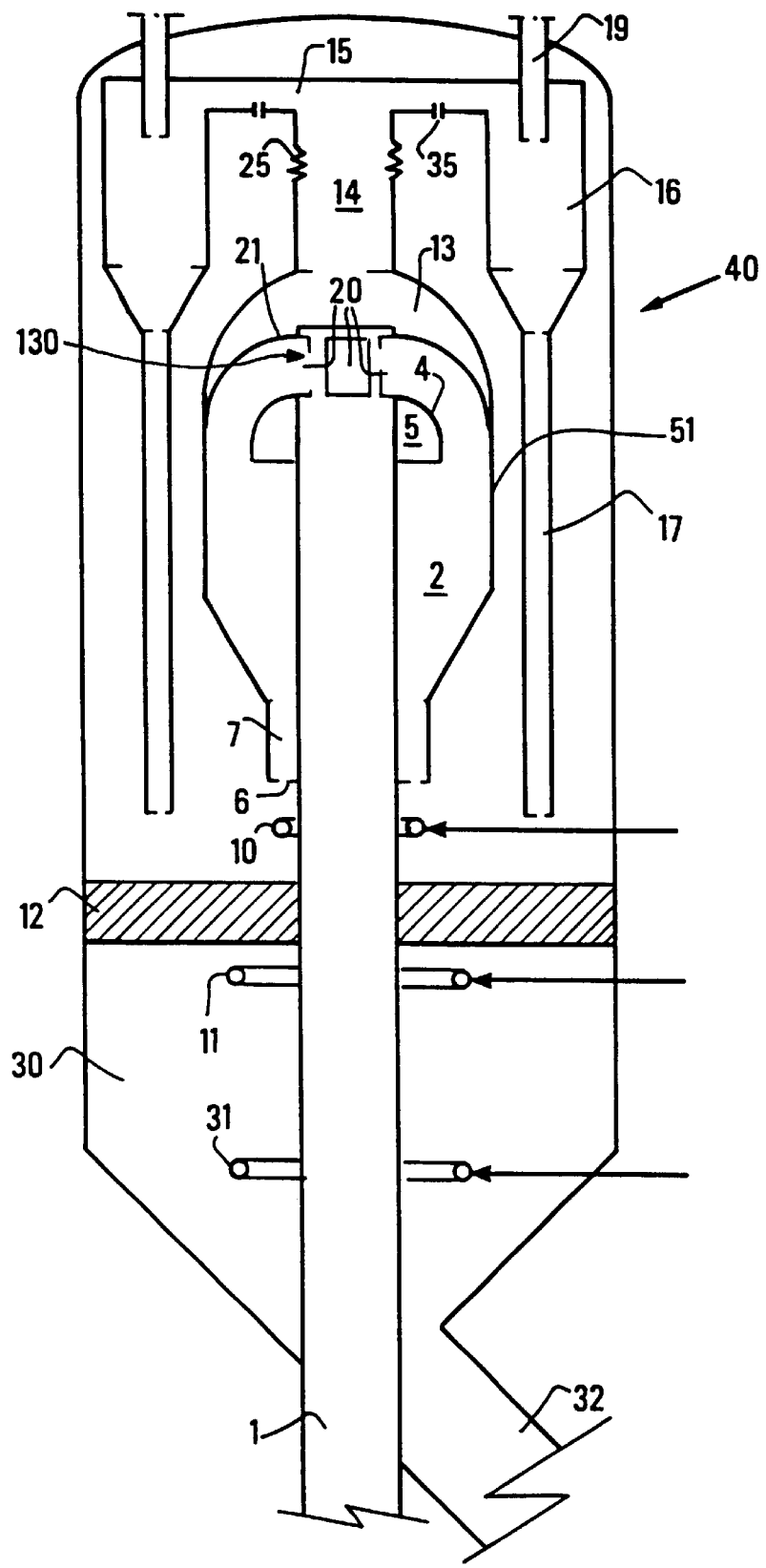
FIG. 4 shows a longitudinal cross section of the apparatus comprising a principal chamber containing the separation vessel in its envelope, the inner secondary separators and the stripping chamber.

In FIG. 4, the gas-solid effluents (the solid containing a gas and a liquid fraction in its pores), enter the apparatus of the invention, only partially represented in the figure, via opening (20) shown in FIG. 1. The solids and the gas are essentially separated in the upper portion of the separation chambers (2) and the gas accompanied by less than 25% of the solid enters the circulation chambers via openings (5) (FIGS. 1, 2). This stream is then evacuated to the upper portion of the circulation chambers (13) and to conduit (14) combining all of the effluents.

Conduit (15) opens laterally from the walls of conduit (14) to carry the effluents to the inlet to conventional secondary gas-solid separators such as internal cyclones (16) contained in a principal envelope (40) and the number of which is generally close to the number of separation and stripping chambers, in order to complete the separation of the solids entrained with the gas downstream of the separation and stripping chambers. The gases, generally containing less than 0.02% by weight of solid particles, are then evacuated via cyclone outlets (19) and is generally sent via conventional means to a column for fractionation of the different hydrocarbon cuts in the case of a catalytic cracking process. The example described above shows that N circulation chambers are connected to M separators (cyclones) via a single conduit (14) connected to the cyclones by M conduits (15). When M and N are equal, it may be advantageous to connect each circulation chamber directly to a separator via a specific conduit. The solids which are not entrained by the gas in separation chamber (2) leave it via opening (6) and can possibly undergo a first contact with a stripping gas introduced beneath the outlet opening (6) via means (10) as shown in FIGS. 1 and 2, being distributed over the whole cross section of flow offered by the stripping chamber or the circulation chambers connected by means (12), and then undergo a second contact with a stripping gas introduced under means (12) via means (11) as shown in FIGS. 1 and 2. The solids recycled from cyclones (16) via diplegs (17) are mixed with the solids outside the circulation chambers isolated by envelope (51) preferably above an opening in the envelope opening into principal vessel (40) containing the cyclones, the separation-circulation vessel of the invention, and stripping chamber (30). The solids can then flow downwards into a chamber (30) containing other means (31) for introducing a stripping gas which are well known in the prior art, and can be evacuated to the regeneration zone of the catalytic cracking process via an outlet (32) the disposition of which can, for example be laterally of chamber (30) with an inclination of at least 30° downwards from the horizontal. The stripping gases introduced via the different means used in zone (30) are essentially evacuated to the cyclones in vessel (40) outside the separation chambers (2) and the circulation chambers (3) and are mixed with the gases separated by the separation-stripping apparatus by means of openings (35) in conduits (14) or (15). The stripping gas introduced via means (10), (11) and (31), and the gas and liquids desorbed from the pores of the catalyst, are evacuated to cyclones (16) through circulation chambers (3) where they rejoin the gas separated directly in the separation chamber through openings (5).

It may be advantageous for the assembly of stripping gas from zone (30) and those gases introduced via means (10),

(11) and (31) to be evacuated to cyclones (16) through circulation chambers (3).

In this case, all openings (35) in conduits (14) and (15) connecting the cyclones (16) to the circulation chambers are removed and an inert gas (such as steam) is used to provide a flush of gas in chamber (40) to prevent the formation of coke connected with the presence of stagnant hydrocarbons.

Figure 5:
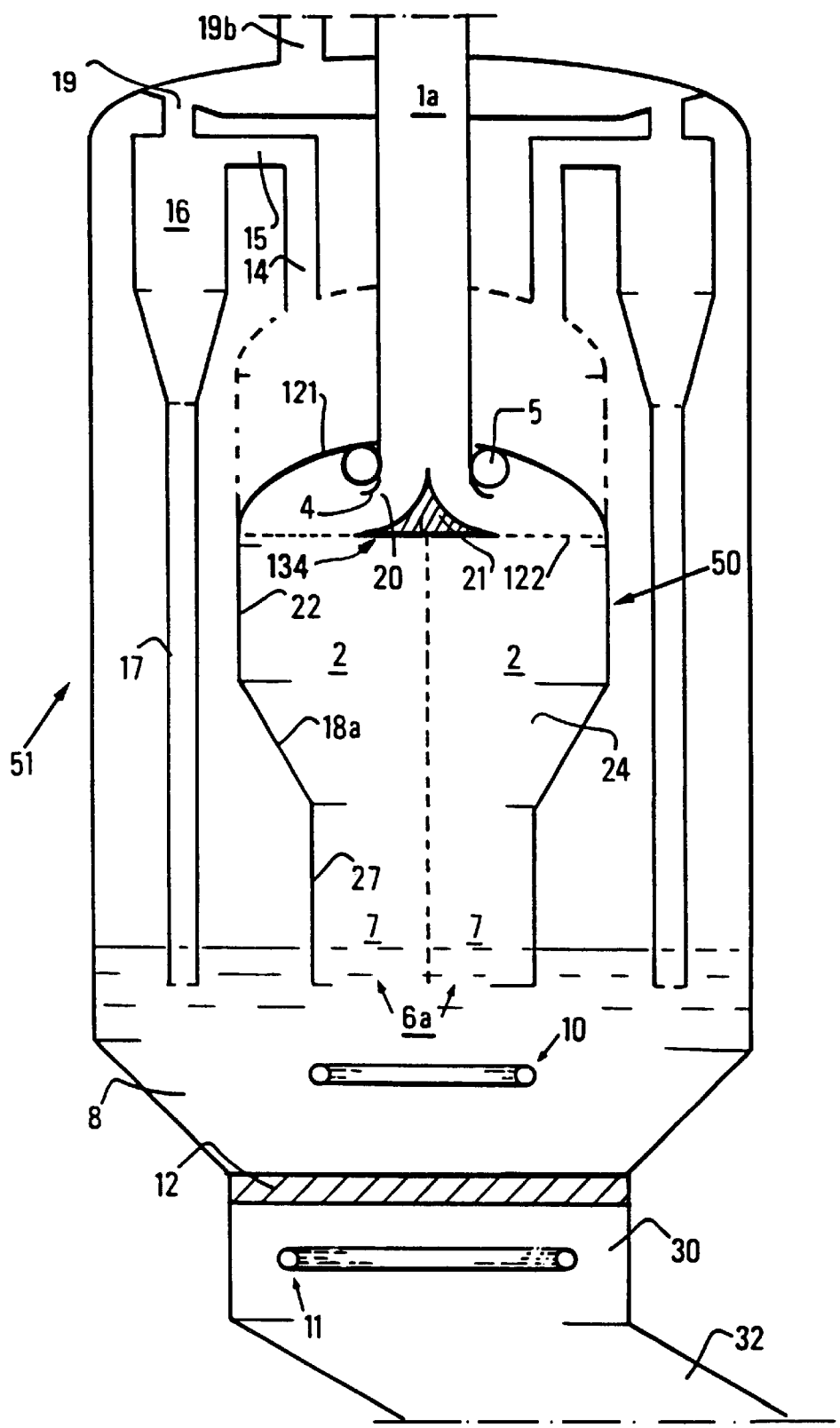
FIG. 5 shows a longitudinal cross section through particle separation chambers at the outlet of a dropper reactor.
Figure 6:
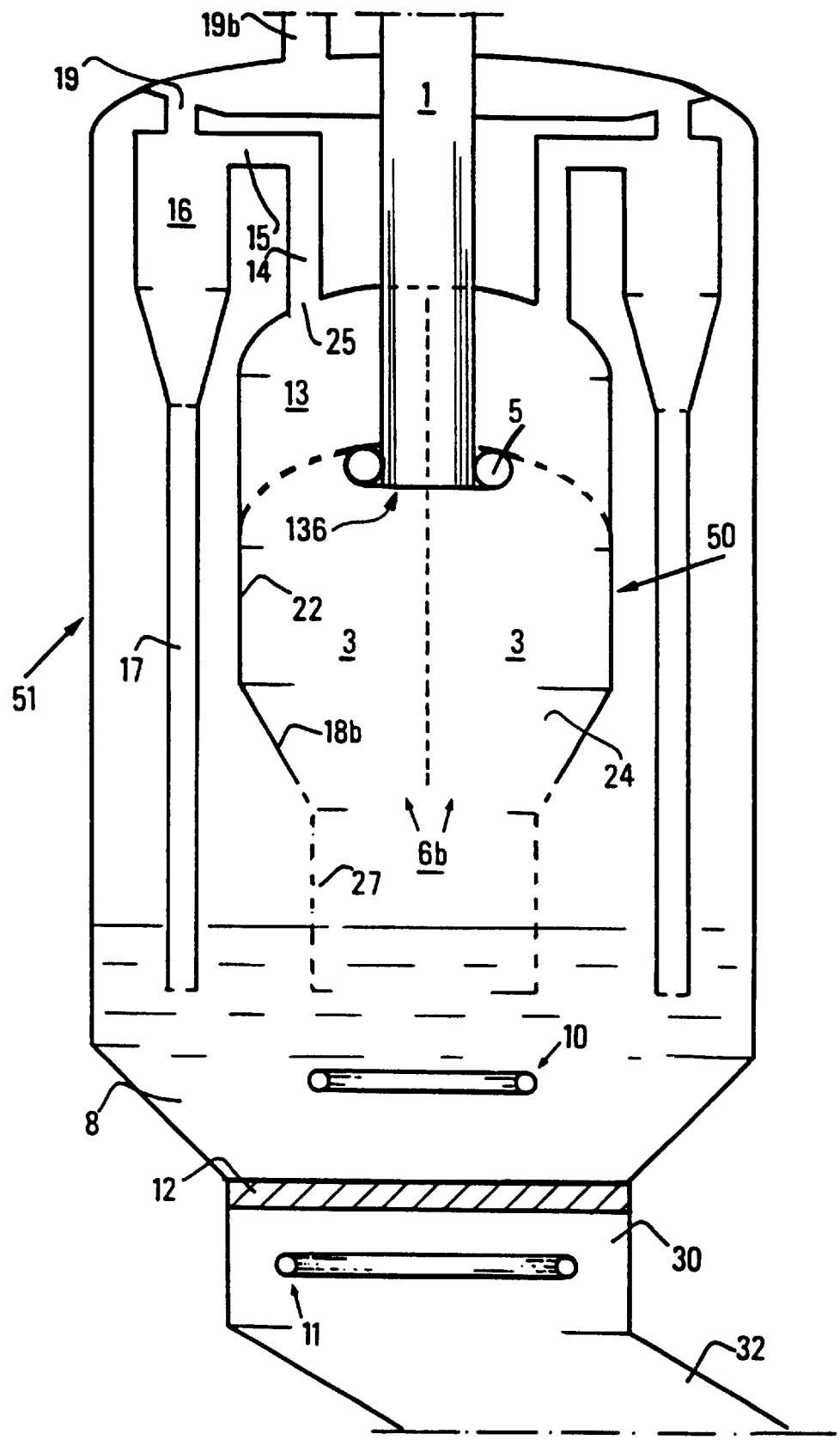
FIG. 6 shows a longitudinal cross section through gas circulation chambers adjacent to the separation chambers which are connected to cyclones internal to the separation and stripping vessel.

FIGS. 5 and 6 show a separation and stripping apparatus connected to a reactor at least an outlet portion of which is a catalytic cracking reactor with a downflow of gas and particles.

The outlet is tubular and substantially vertical. The invention is particularly intended for separating effluents at the outlet from catalytic cracking reactors where the gaseous and liquid phases are constituted by mixtures of hydrocarbons and water, and where the solid is a silica-alumina based catalyst, generally containing at least 15% of zeolites. From a gas-solid mixture, where the solid possibly contains liquid fractions in its pores, the apparatus of the invention can produce a gas-solid phase containing less than 25% of solids and the essential portion of the gaseous phase introduced to the inlet, and at least 75% of the solids introduced to the inlet, these latter solids then undergoing a contact phase with a carefully selected gas (such as steam) to at least partially desorb the liquid-vapour mixture contained inside the pores of the solid.

These performances are obtained by means of a compartmented arrangement of separation chambers and gas circulation chambers axially distributed about the reaction zone and communicating with each other, as shown in FIGS. 5 and 6. The apparatus is constituted by N separation chambers and N effluent circulation chambers, N being in the range 1 to 10, preferably in the range 2 to 6. Their cross section is at least partially triangular with one wall in the form of an arc of a circle. An envelope (51) includes the separation chambers (2) and circulation chambers (3). This envelope is preferably substantially asymmetric about an axis which is identical with the axis of reactor (1).

Each separation chamber (2) is connected to reactor (1) by means of an opening (20) formed in the walls of the reactor. The openings (20) of each compartment (2) all have the same cross section of flow. A deflector (21) with a curvilinear wall located at the bottom of the reactor laterally deflects the flow towards an opening in the separation chambers (20), and initiates rotation of the flow of gas and particles in the upper portion of the separation chambers, thus encouraging segregation of the phases from the inlet (20). The separation chambers are constituted by at least two outlets, one (122) located in the extension of deflector (21) in a plane substantially perpendicular to the axis of reactor (1) for evacuating solid particles, the others, located above inlet (20) for evacuating the gaseous phase containing few particles to the adjacent circulation chambers via openings (5) located in the lateral walls of the separation chambers which are also those of the combustion chambers. A deflector (4) for channeling the flow and encouraging rotation of the gas can advantageously be inserted in the extension of inlet (20) of each chamber. This deflector extends along the contours formed by the gas outlets by forming an angle of between a few degrees and 180° with the reactor axis, preferably between 45° and 90°.

The upper portion of the separation chamber is intended to cause separation of the gaseous and solid phases by a centrifugal and inertial effect which is exerted on the solid due to a change in the direction of flow during passage in the upper portion of the separation chamber. The invention thus concerns any means employed to cause a change of flow direction in a plane containing the reactor axis, which may or may not be accompanied by a change in the cross section of flow to shape the flow at the reactor outlet. One example of such a flow direction change means 134 is shown in FIG. 5. Opening (20) opens into a compartment distributed axially about the reactor axis, the upper portion of which is constituted by a deflector connected to the lower extremity of reactor (21), enabling the flow to be rotated and forming a curvilinear deflection of 90° from the reactor axis to the separation chamber. It is also possible to substitute part of deflector (21) by a sharper transition, for example using a flat bottom at the base of the reactor which is substantially asymmetric with the axis of reactor (1).

Each separation chamber is provided with two substantially vertical lateral walls (24) preferably located in a plane containing the reactor axis (1), which delimit the separation chambers (2) from the circulation chambers (3). An opening (5) is located in each wall (24) to evacuate the gas phase and less than 25% of the solid which has entered each separation chamber via opening (20). This opening is preferably circular in shape, but other shapes (rectangular, trapezoidal . . . ) are also possible. The highest point of opening (5) is located above the lowest point of opening (20). The lowest point of opening (5) is located above or at the level of opening (122) which evacuates the essential portion of the solids towards the bottom of separation chamber (2) above a stripping chamber (8, 30).

In order to obtain good separation efficiency, it is preferable to isolate outlets (5) from inlet zone (20). Advantageously, a deflector (4) which is preferably axially symmetrical about the reactor axis and following the shape of opening (5) in the vertical plane is used. This deflector (4) will advantageously be rolled around the projection of the gas outlets (5), forming an angle of a few degrees to 180°, preferably in the range 45° to 90°. This deflector will allow the solid-gaseous mixture leaving at (5) a cross section of flow of at least 10% of the cross section of flow offered by an opening (5), preferably at least 50%.

The essential portion of the solid phase, which may entrain a small quantity of gas between its grains and gas and liquid adsorbed in its pores, flows along wall (22) located below opening (122) and leaves each separation chamber via an opening (6a) located lower than opening (5) in a plane substantially perpendicular to the reactor axis, and perpendicular to opening (5). In order to restrict the quantity of gas entrained with the solids in opening (6a), it is prudent to limit the cross section of flow of this opening. This can be achieved by direct inclination of outer wall (22) at a re-entry angle towards the reactor axis at an angle in the range from a few degrees to 45° to the vertical, preferably in the range 10° to 30°, or by extending wall (22) if it is substantially vertical by a wall inclined at a re-entry angle towards the reactor at an angle in the range from a few degrees to 45° to the vertical, preferably in the range 10° to 30°, as shown in FIG. 5, to create a transition zone in the form of a truncated cone delimited by a wall (18a) and a zone (7) delimited by a substantially vertical wall (27) with a limited cross section of flow with respect to the cross sections of flow in the upper portion of the separation chamber, and by the lateral walls (24) of the separation chamber which beneath opening (122) all converge into a segment coinciding substantially with the axis of reactor (1). It is also possible to extend wall (22) vertically to the bottom of chamber (2) and to insert a solid block of material, for example a refractory material, along wall (22) or between the lateral walls of the separation chambers in the outlet zone to create a restricted flow in zone (7) with respect to zone (2) while maintaining walls (22) and (27) in perfect alignment.

This restriction means can also use the circulation chambers in its lower portion when all of the outer wall is vertical.

The circulation chambers have two substantially vertical lateral walls (24) preferably located in a plane containing the axis of reactor (1), which delimit the separation chambers from the circulation chambers. An opening (5) is located in each wall (24), to enable the separation chambers to communicate with the circulation chambers. To limit problems of bulk, the upper portion of circulation chambers (3) preferably have substantially the same radius with respect to the reactor axis as the separation chambers (2). Nevertheless, this condition is not indispensable to proper operation of the apparatus. The diameter of the upper portion of the stripping zone (8) can be larger than that of portion (3). In this case, it will contain all of the lower portions of the separation chambers (7) and its outer wall (30) will extend 360° about the reactor axis (1).

The circulation chambers communicate with each other above the apex of separation chambers (2) and their geometry in this zone reduces to form a convergent (13) which forms the outlet for the essential portion of the gas phase and less than 25% of the solids from the apparatus.

The circulation chambers (3) are preferably open at their lower portions to enable stripping gas from vessel (51) emanating from means (10) for stripping the catalyst in a fluidised bed to rise. It may be advantageous for opening (6b) from the circulation compartments above the fluidised bed to be located at the bottom of a conical section portion (18b) which would have the effect of limiting the possibilities of gases emanating from opening (5) from circulating under this opening into the dilute phase located above the opening. In order to limit entrainment of the fluidised bed catalyst entering via opening (6b) to the apex of the circulation chambers and subsequently to the secondary cyclones (16), it is advantageous to locate these openings about 1 to 10 m, preferably 2 to 5 m above the surface of the fluidised bed. Further, to simplify the construction of the apparatus, the conical section 18b can preferably have the same inclination as the conical section 18a of the separation chambers.

In order to properly distribute the catalyst from separation zone outlets (7) over the whole cross section of flow of the fluidised beds into which openings (6a) from the separation chambers preferably dip, means (12) can be distributed over the whole cross section of flow to render the flow uniform and limit re-circulation zones. These means will, for example, be stacks of packing, such as those used in distillation columns, ranks of interlaced tubes positioned one over the other, or inclined plates forming a particular crisscross pattern to encourage radial migration of the solid. Means (10,11) for introducing a gas such as nitrogen or steam or ammonia to encourage desorption of the liquid or gaseous hydrocarbons contained inside the pores of the catalyst grains are optionally located beneath these means and beneath outlet (6a) from the separation zone.

The separated solids leaving the separation chamber via opening (6a) or via opening (6b) in the circulation chamber are then introduced into the principal stripping zone of the unit, constituted by a fluidised bed the level of which is preferably between opening (6b) and opening (6a), generally 1 to 2 m above (6a) and at least 2 m beneath (6b), which is in general a fluidised bed contact zone where descending solids come into contact with a counter-current of a stripping gas such as steam, nitrogen or ammonia. The average mass flow rate of the catalyst in this zone is generally about 10 to 300 kg/s/m$^2$, preferably 30 to 150 kg/s.m$^2$. The average rate at which the stripping gas rises is generally in the range 0.1 to 1 m/s.

The rate at which the gas rises through opening (6b) towards the external cyclone (16) is normally in the range 0.2 to 10 m/s, preferably in the range 0.5 to 5 m/s. This confines the separated gas coming from orifice 5 in the volume of the circulation chamber.

Specific insertion of the apparatus of the invention into the reaction zone of a catalytic cracking unit and its operation will now be described for two particularly suitable cases shown in FIGS. 5 and 6 which use different techniques for dimensioning the units.

In FIGS. 5 and 6, the gas-solid effluents (the solid containing a fraction of gas and of liquid in its pores) enter the apparatus of the invention, only partially represented in the figure, via opening (20). The solids and the gas are essentially separated in the upper portion of separation chambers (2) and the gas, accompanied by less than 25% of the solid, penetrates into the circulation chambers via openings (5). This stream is then evacuated towards the upper portion of the circulation chambers (13) and towards conduit (14) which combines all of the effluents.

Conduits (15) which open laterally from the walls of conduit (14) carry the effluents to the inlet to conventional gas-solid secondary separators such as cyclones (16), the number of which is generally close to the number of separation and stripping chambers, to complete separation of the solids entrained with the gas downstream of the separation and stripping chambers. The gases, generally containing less than 0.02% by weight of solid particles, are evacuated via outlets (19 and 19b) from the cyclones and are generally sent directly to a column for fractionating different hydrocarbon cuts in the case of a catalytic cracking process. The example described above shows that N circulation chambers are connected to M separators (cyclones) via a single conduit (14) connected to the cyclones by M conduits (15). When M and N are equal, it may be advantageous to connect each circulation chamber directly to a separator via a specific conduit. The solids which are not entrained by the gas in separation chamber (2) leave it via opening (6a) and can possibly undergo a first contact with a stripping gas introduced beneath (6a) via means (10) as shown in FIGS. 5 and 6, being distributed over the whole cross section of flow offered by the combined stripping zones by means (12), and then undergo a second contact with a stripping gas introduced beneath means (12) via suitable means (11). The solids are mixed with solids recycled from cyclones (16) via diplegs (17) in stripping vessel (8), preferably above radial homogenisation means (12) if those are used in dimensioning the apparatus. The solids can then flow downwards into a zone (30) containing other means for introducing a stripping gas which are well known in the prior art, and can be evacuated to the regeneration zone of the catalytic cracking process via an outlet (32) the disposition of which can, for example, be laterally of zone (30) with an inclination of at least 30° downwards from the horizontal. The stripping gases introduced via the different means used in zone (30) and by means (10 and 11) which may be used, also the gas and liquids desorbed from the catalyst pores, are evacuated to the cyclone s(16) through the circulation chambers (3) where they rejoin the gases separated directly in the separation chamber and evacuated through opening (5).

In the disposition envisaged here, walls (51) of the vessel containing the apparatus of the invention and outer envelopes (22), (18a) and (18b) are distinct. The secondary separation apparatus are located in the space between these two vessels.

In a variation (not shown), the apparatus differs essentially from the preceding embodiment in that the envelope

(22) and envelope (51) are identical. The secondary separation apparatus (16) are located in the external space located outside these two vessels.

The entire disclosure of all applications, patents and publications, cited above and below, and of corresponding PCT/FR98/01866, filed Aug. 31, 1998, claiming priority of French Application 97/10929, filed Sep. 1, 1997, and French Application 98/09672, filed Jul. 28, 1998, is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An apparatus for separating and stripping a gaseous mixture and a stream of particles, comprising a reaction envelope (51) containing a vessel (50) for separating particles from a gaseous mixture and a vessel for stripping the particles located below the separation vessel (50), said separation vessel comprising a plurality of separation chambers (2) and a plurality of circulation chambers (3) distributed axially about one extremity of a central upflow reactor (1) of elongate form, and disposed in alternating manner about the central reactor in which the gaseous mixture and the particle stream circulates, an upper portion of each separation chamber (2) comprising an inlet opening (20) communicating with the reactor and with a flow direction change means (130) defined in part by one outer wall of the separation chamber, so as to separate the particles from the gaseous mixture in a substantially vertical plane, each separation chamber (2) comprising two substantially vertical lateral walls (24) which are also the walls of the circulation chamber (3), at least one of the vertical walls (24) of each chamber (2) comprising a first lateral outlet opening (5) below the inlet opening 20 enabling the gaseous mixture to communicate with an adjacent circulation chamber, each separation chamber comprising an outer wall (21, 121) and an inner wall which with the lateral walls (24) define an opening (6) for a substantially axial outlet for particles located below a first gaseous mixture outlet opening (5), a particle outlet opening (6) communicating below each of the separation chambers (2) with a stripping chamber (8,30) which contains at least one principal stripping means (11), envelope (51) further comprising at least one conduit (14) for evacuating a mixture containing gaseous effluents and a minor portion of particles from the circulation chambers (3), and at least one secondary separator (16) for separating particles from gaseous effluents connected to the evacuation conduit (14) comprising an outlet (19) for gaseous effluents and a particle outlet (17), said stripping chamber communicating with a mixture evacuation conduit (14) via the circulation chambers (3).

2. An apparatus according to claim 1, the upper portion of each separation chamber comprising an inlet opening (20) communicating with the reactor and with the flow direction change means (130) to separate the particles from the gaseous mixture by a centrifugal effect, the flow direction change means (130) being adapted to rotate the gaseous mixture and particles in a vertical plane through an angle of at most 360 degrees.

3. An apparatus according to claim 2, in which each separation chamber (2) comprises means (4) below the inlet opening for preventing re-circulation of gaseous mixtures, connected to the reactor.

4. An apparatus according to claim 3, in which at least an upper portion of the means for preventing re-circulation of the gaseous mixture is coextensive with the lateral openings (5) in wall (24) in the vertical plane.

5. An apparatus according to claim 2, in which an opening from the separation chambers dips into a fluidised bed contained in the stripping chamber (8).

6. An apparatus according to claim 3, in which an opening from the separation chamber dips into a fluidised bed contained in the stripping chamber (8).

7. An apparatus according to claim 1, in which an outer wall (132) is distinct from the envelope (51) of the vessel and delimits an annular space with said envelope.

8. An apparatus according to claim 1, in which the secondary separator (16) is external to the envelope (51).

9. An apparatus according to claim 1, in which the secondary separator (16) is contained in the envelope (51).

10. An apparatus according to claim 1, in which the outer walls of the separation and circulation chambers are vertical and in which a lower portion of the separation and circulation chambers comprise a flow restriction means.

11. An apparatus for separating and stripping a gaseous mixture and a stream of particles, comprisinga reaction evelope (51) containing a vessel (50) for separating the particles from the mixture and a vessel for stripping the particles located below the separation vessel (50), said separation vessel comprising a plurality of separation chambers (2) and a plurality of circulation chambers (3) distributed axially about one extremity of a central downflow reactor (1a) of elongate form, and disposed in alternating manner about the central reactor in which the gaseous mixture and the particle stream circulates, an upper portion of each separation chamber (2) comprising an inlet opening (20) adapted to communicate with the reactor 1a, so as to separate the particles from the gaseous mixture in a substantially vertical plane, each separation chamber (2) comprising two substantially vertical lateral walls (24) which are also the walls of the circulation chamber (3), at least one of the vertical walls (24) of each chamber (2) comprising a first lateral outlet opening (5) below opening 20 enabling the gaseous mixture to communicate with an adjacent circulation chamber, each separation chamber comprising an outer wall (121) and an inner wall which the lateral walls (24) define an opening (6) for substantially axial outlet for particles located below a first gaseous mixture outlet opening (5), particle outlet opening (6a) communicating below each of the separation chambers (2) with a stripping chamber (8) which contains at least one principal stripping means (11), envelope (51) further comprising at least a one conduit (14) for evacuating a mixture containing gaseous effleunts and a minor portion of particles from the circulation chambers (3), and at least one secondary separator (16) for separating particles from gaseous effluents connected to the evacuation conduit (14) comprising an outlet (19) for gaseous effluents and a particle outlet (17), said stripping chamber communicating with a mixture evacuation conduit (14) via the circulation chambers (3). which are also the walls of the circulation chamber (3), at least one of the vertical walls (24) of each chamber (2) comprising a first lateral outlet opening (5) below opening (20) enabling the gaseous mixture to communicate with an adjacent circulation chamber, each separation chamber comprising an outer wall (121) and an inner wall which the lateral walls (24) define an opening (6) for substantially axial outlet for particles located below a first gaseous mixture outlet opening (5), particle outlet opening (6a) communicating below each of the separation chambers (2) with a stripping chamber (8) which contains at least one principal stripping means (11), envelope (51) further comprising at least one conduit (14) for evacuating a mixture containing gaseous effluents and a minor portion of particles from the circulation chambers (3), and at least one secondary separator (16) for separating particles from gaseous effluents connected to the evacuation conduit (14) comprising an outlet (19) for gaseous effluents and a particle outlet (17), said stripping chamber communicating with a mixture evacuation conduit (14) via the circulation chambers (3).

12. An apparatus according to claim 11 in which at least a reactor outlet portion is a dropper and the deflector (21) for gas and particles at its lower extremity laterally deflects the flow from the reactor toward the separation chambers and initiates rotation of the flow in a substantially vertical plane to separate particles from the gas by a centrifugal effect;

a first outlet opening (122) being located substantially in the extension of the deflector and enabling particles separated from the gas to pass to a lower portion of the separation chamber, at least one of the walls (24) of each chamber (2) comprising a second lateral outlet opening (5) located above the deflector (21) and above a first opening (122) to enable gas cleaned from a large portion of the particles to communicate with the adjacent circulation chamber.

13. An apparatus according to claim 12, in which each separation chamber (2) comprises means (4) above the inlet opening for preventing re-circulation of gaseous mixtures, connected to the reactor.

14. An apparatus according to claim 13, in which at least a lower portion of the means for preventing re-circulation of the gaseous mixture is coextensive with but spaced from the lateral opening (5) in wall (24) in the vertical plane.

15. An apparatus according to claim 11, in which lower portions of the separation (2) and circulation (3) chambers comprise a portion in the form of a truncated cone (18a, 18b) opening upwardly.

16. An apparatus according to claim 11, in which the outer walls of the separation and circulation chambers are vertical and in which a lower portion of the separation and circulation chambers comprise a flow restriction means.

17. An apparatus according to claim 11, in which the circulation chambers comprise a lower opening (6b) at a height of 1 to 10 m above an upper surface of a fluidised bed contained in the stripping vessel.

18. An apparatus according to claim 11, in which the circulation chambers comprise a lower opening (6b) at a height of 2 to 5 m above an upper surface of a fluidised bed contained in the stripping vessel.

19. An apparatus according to claim 11, in which an opening from the separation chambers dips into a fluidised bed contained in the stripping chamber (8).

20. An apparatus for separating and stripping a gaseous mixture and a stream of particles, comprising a reaction envelope (51) containing a vessel (50) for separating the particles from the mixture and a vessel for stripping the particles located below the separation vessel (50), said separation vessel comprising a plurality of separation chambers (2) and a plurality of circulation chambers (3) adapted to be distributed axially about one extremity of a central upflow reactor (1) of elongate form and disposed in alternating manner about the central reactor in which the gaseous mixture and the particle stream circulate, an upper portion of each separation chamber (2) comprising an inlet opening (20) adapted to communicate with the reactor and with a flow direction change means (130) defined in part by one outer wall of the separation chamber, so as to separate the particles from the gaseous mixture in a substantially vertical plane, each separation chamber (2) comprising two substantially vertical lateral walls (24) which are also the walls of the circulation chamber (3), at least one of the vertical walls (24) of each chamber (2) comprising a first lateral outlet opening (5) below the inlet opening 20, enabling the gaseous mixture to communicate with an adjacent circulation chamber, each separation chamber comprising an outer wall (21) and an inner wall which with the lateral walls (24) define an opening (6) for a substantially axial outlet for particles located below a first gaseous mixture outlet opening (5), particle outlet openings (6) communicating below each of the separation chambers (2) with a stripping chamber (8, 30) which contains at least one principal stripping means (11), envelope (51) further comprising at least one conduit (14) for evacuating a mixture containing gaseous effluents and a minor portion of particles form the circulation chambers (3), and at least one secondary separator (16) for separating particles from gaseous effluents connected to the evacuation conduit (14) comprising an outlet (19) for gaseous effluents and a particle outlet (17), said stripping chamber communicating with a mixture evacuation conduit (14) via the circulation chambers (3).

21. An apparatus for separating and stripping gaseous mixture and a stream of particles, comprising a reaction envelope (51) containing a vessel (50) for separating the particles from the mixture an a vessel for stripping the particles located below the separation vessel (50), said separation vessel comprising a plurality of separation chambers (2) and a plurality of circulation chambers (3) adapted to be distributed axially about one extremity of a central downflow reactor (1a) of elongate form and disposed, in alternating manner about the central reactor in which the gaseous mixture and the particle stream circulates, an upper portion of each separation chamber (2) comprising an inlet opening (20) adapted to communicate with the reactor (1a) and with a defined in part by one outer wall of the separation chamber and a defector (21) at the base of (130) downflow reactor (1a), so as to separate the particles from the gaseous mixture in a substantially vertical plane, each separation chamber (2) comprising two substantially vertical lateral walls (24) which are also the walls of the circulation chamber (3), at least one of the vertical walls (24) of each chamber (2) comprising a first lateral outlet opening (5) below opening (20) enabling the gaseous mixture to communicate with an adjacent circulation chamber, each separation chamber comprising an outlet wall (121) and an inner wall which with the lateral walls (24) define an opening (6a) for a substantially axial outlet for particles located below a first gaseous mixture outlet opening (5), particle outlet opening (6a) communicating below each of the separation chambers (2) with a stripping chamber (8, 30) which contain at least one principal stripping means (11), envelope (51) further comprising at least one conduit (14) for evacuating a mixture containing gaseous effluents and a minor portion of particles from the circulation chambers (3), and at least one secondary separator (16) for separating particles from gaseous effluents connected to the evacuation conduit (14) comprising an outlet (19) for gaseous effluents and a particle outlet (17), said stripping chamber communicating with a mixture evacuation conduit (14) via the circulation chambers (3).

* * * * *